(12) United States Patent
Ching

(10) Patent No.: US 7,117,890 B2
(45) Date of Patent: Oct. 10, 2006

(54) SHUTTLING VEHICLE LEVELING VALVE

(75) Inventor: Angel Ching, Montebello, CA (US)

(73) Assignee: Barksdale, Inc., Los Angeles, CA (US)

( * ) Notice: Subject to any disclaimer, the term of this patent is extended or adjusted under 35 U.S.C. 154(b) by 394 days.

(21) Appl. No.: 10/703,874

(22) Filed: Nov. 8, 2003

(65) Prior Publication Data

US 2005/0098965 A1    May 12, 2005

(51) Int. Cl.
*B60G 17/00*   (2006.01)
*F16K 11/14*   (2006.01)

(52) U.S. Cl. ............... 137/596.17; 251/175; 251/176; 251/319

(58) Field of Classification Search ........... 251/175, 251/176, 186, 318, 319; 137/596, 596.17
See application file for complete search history.

(56) References Cited

U.S. PATENT DOCUMENTS

| | | | | |
|---|---|---|---|---|
| 14,999 | A | * | 6/1856 | Burdon .................. 251/319 |
| 253,166 | A | * | 1/1882 | Hooker .................. 251/175 |
| 299,004 | A | * | 5/1884 | Pearson ................. 251/175 |
| 5,312,119 | A | * | 5/1994 | Schneider et al. ....... 280/766.1 |
| 5,682,922 | A | * | 11/1997 | Galazin et al. ......... 137/627.5 |
| 6,202,992 | B1 | | 3/2001 | O'Reilly et al. ....... 267/64.18 |

* cited by examiner

*Primary Examiner*—Stephen M. Hepperle
(74) *Attorney, Agent, or Firm*—Leon D. Rosen

(57) ABSTRACT

A valve for supplying pressured air to vehicle air bags, includes a shuttle (20) with a valving member (80) having a precision polished seal surface (86) that presses against a precision polished sealed-against housing lower surface (50) of a housing (14) that confines the shuttle to sliding left and right. A recess (90) in the valving member can connect first and second holes (52 and 56, 58) in the housing lower surface, or isolate the holes from each other. The shuttle includes a shuttle frame (70) with a vertical bore (74) that receives a guiding part (82) of the valving member. A conduit extends from the valving member recess to a sealed region (102) at the top of the vertical passage to pressurize the sealed region with pressured air, to push down the valving member against the housing lower surface.

5 Claims, 4 Drawing Sheets

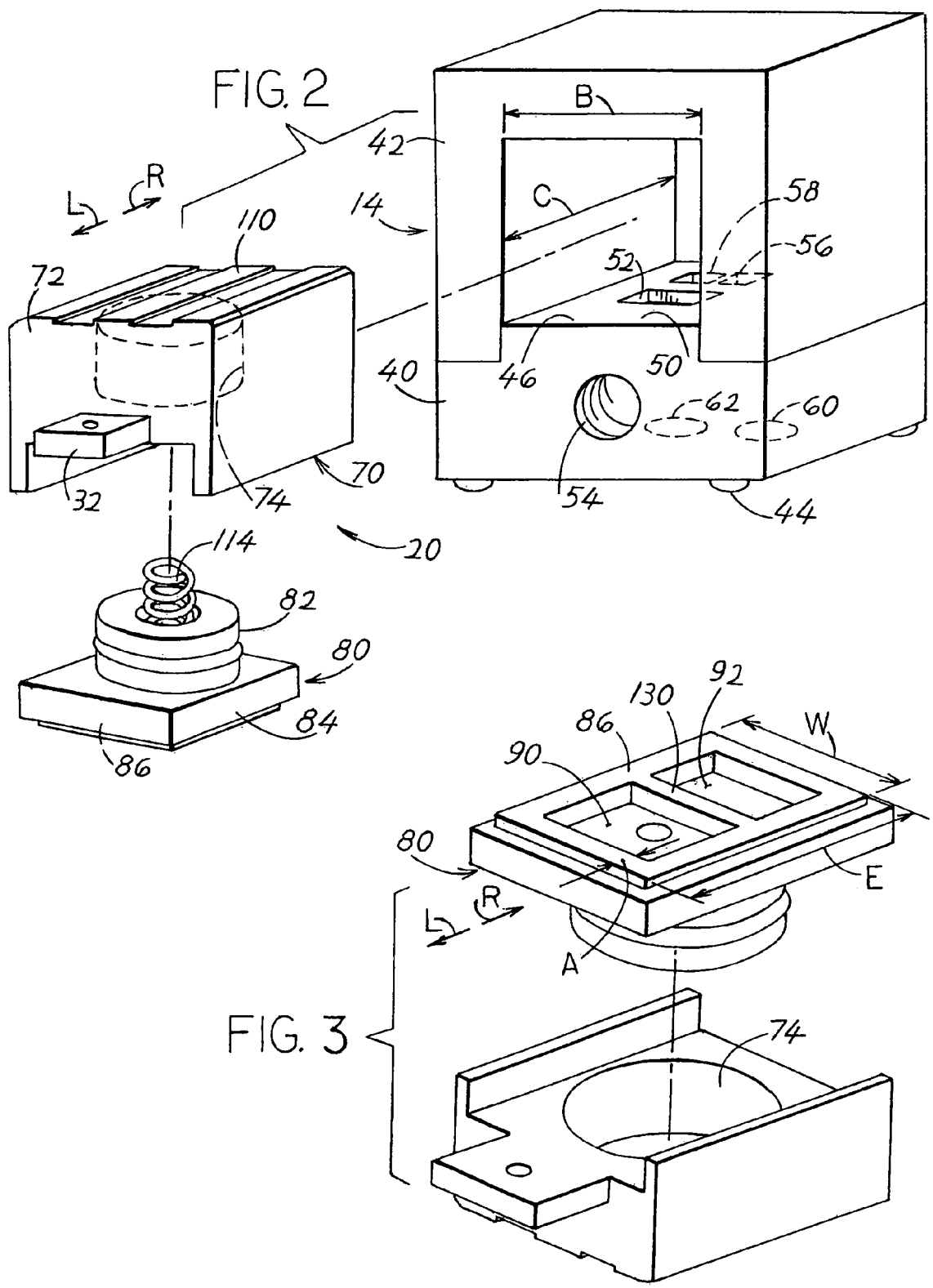

SHUTTLING VEHICLE LEVELING VALVE

BACKGROUND OF THE INVENTION

Large vehicle suspensions generally have air bags whose height must be maintained close to a predetermined height. When extra cargo is loaded on a truck so the air bag height decreases, pressured air from a pressured air source (e.g. at 140 psi) flows into the air bag, whose pressure may vary between about 40 and 70 psi, with varying load. Valves for flowing air into our out of one or more air bags are often referred to as leveling valves. One effective type of valve uses a pivotally-mounted disc that has a polished seal surface that bears against a polished housing surface. A linkage moves when the air bag height changes, to pivot the disc so as to connect pressured air to an air bag. Holes in a disc surface are of a predetermined diameter in order to pass air at a predetermined rate to an air bag. Most of the disc is not used to contain a hole or to seal, and the use of such disc results in a relatively large area on the disc and on the housing surface engaged by the disc, that have to be ground and polished with high precision. An air bag valve that minimized the areas that must be polished with high precision, would be of value.

There have been suggestions to control air bag height using an electronic control, as compared to a mechanical linkage without electronic control. Such electronic control often can more easily operate a valve that slides rather than one that turns. For example, an electrically energized solenoid provides a simple means for moving a valve member, and it generally uses a simpler connection when connected to a sliding shuttle than to a pivoting disc.

SUMMARY OF THE INVENTION

In accordance with one embodiment of the present invention, a vehicle leveling valve is provided, which can use precision polished sealing surfaces of relatively small size compared to the sizes of passages through which air passes, to provide a smaller and lower cost valve. The valve includes a shuttle that can slide in left and right directions within a housing shuttle passage. The shuttle includes a shuttle frame and a valving member that slides left and right with the shuttle frame. A bottom wall of the frame passage has first and second holes, while the valving member has a recess that can be aligned with both holes to transfer pressured gas from one hole to the other.

The valving member has an upstanding vertical guide part that is closely received within a vertical bore in the shuttle frame. The vertical guide part is sealed to the walls of the vertical bore to form a sealed region at the top of the vertical bore. The recess in the seal surface of the valving member is connected through a conduit to the sealed region, to maintain an air pressure against the top of the vertical guide part that is largely proportional to the pressure of air in the first hole of the housing. A part of the conduit holds a compression spring that presses down the valving member even when there is no air pressure.

The novel features of the invention are set forth with particularity in the appended claims. The invention will be best understood from the following description when read in conjunction with the accompanying drawings.

BRIEF DESCRIPTION OF THE DRAWINGS

FIG. 2 is an exploded isometric view of the valve of FIG. 1.

FIG. 3 is an upside-down view of only the shuttle frame and valving member of the valve of FIG. 2.

DESCRIPTION OF THE PREFERRED EMBODIMENTS

Figure 1:
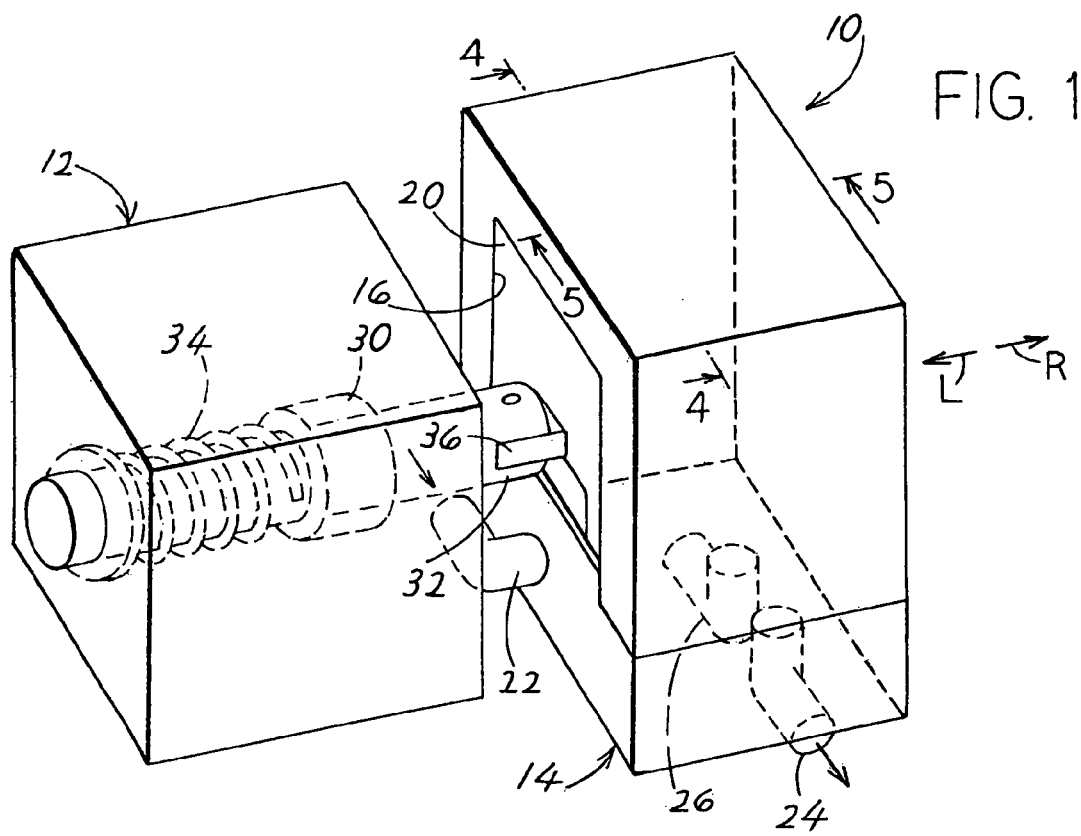
FIG. 1 is an isometric view of a vehicle leveling valve of the present invention, and also showing a solenoid actuator for operating the valve.

FIG. 1 illustrates the combination of a vehicle leveling valve 10 and an actuator 12 for operating the valve. The valve includes a housing 14 that forms a horizontal shuttle-confining passage 16 that confines a shuttle 20 to movement in left L and right R longitudinal directions. A high pressure air coupling 22 connects to a high pressure source on the vehicle, such as a source of pressured air at 140 psi that operates brakes and a horn, as well as air bags. The valve has a pair of air bag air couplings 24, 26 that connect to a pair of air bags lying on opposite sides of the vehicle. Air bags at opposite sides of the vehicle are often kept at the same air pressure. It is also possible to construct the valve so it has only one air bag coupling such as 24 that connects to only a single air bag.

The actuator 12 that is illustrated, is a solenoid with a coil 30 that can move a plunger 32 to the right, and with a spring 34 that returns the plunger to the leftward position when the coil is not energized. The actuator plunger 32 is connected to a coupling block 36 that is part of the shuttle to move the shuttle.

The housing 14 shown in FIG. 2 includes a base 40 and a enclosure member 42 that are fastened together by screws such as 44. In the particular housing illustrated the base 40 is of metal and the enclosure member is of plastic. The metal base 40 forms a bottom passage wall 46 with a precision polished sealed-against surface 50. A first hole 52 is formed in the bottom passage wall 46, and connects to a port 54 to which the high pressure source is connected. A pair of second holes 56, 58 is formed in the bottom passage wall, at a position rightward of the first hole 52. The second holes 56, 58 are connected to a pair of ports 60, 62 that connect to the air bag air couplings shown in FIG. 1 that lead to the air bags.

The shuttle 20 includes a shuttle frame 70 with a main portion 72 forming a vertical bore 74. The shuttle also includes a valving member 80 with an upstanding guiding part 82 that fits closely within the vertical bore 74 of the shuttle frame. The valving member also has a seal block portion 84 that forms a precision polished seal surface 86 that is intended to form a pressure seal against the sealed-against surface 50 of the housing. FIG. 3, which is an upside-down view of the shuttle parts (except the spring) of FIG. 2, shows that the seal surface 86 includes a main recess 90 which is intended to normally lie over the first hole 52 of the sealed-against surface of FIG. 2. The seal surface 86 also includes a secondary recess 92 which is intended to lie over the first and second holes 56, 58 of FIG. 2 to connect the air bags, in the leftward initial position of the shuttle.

Figure 4:
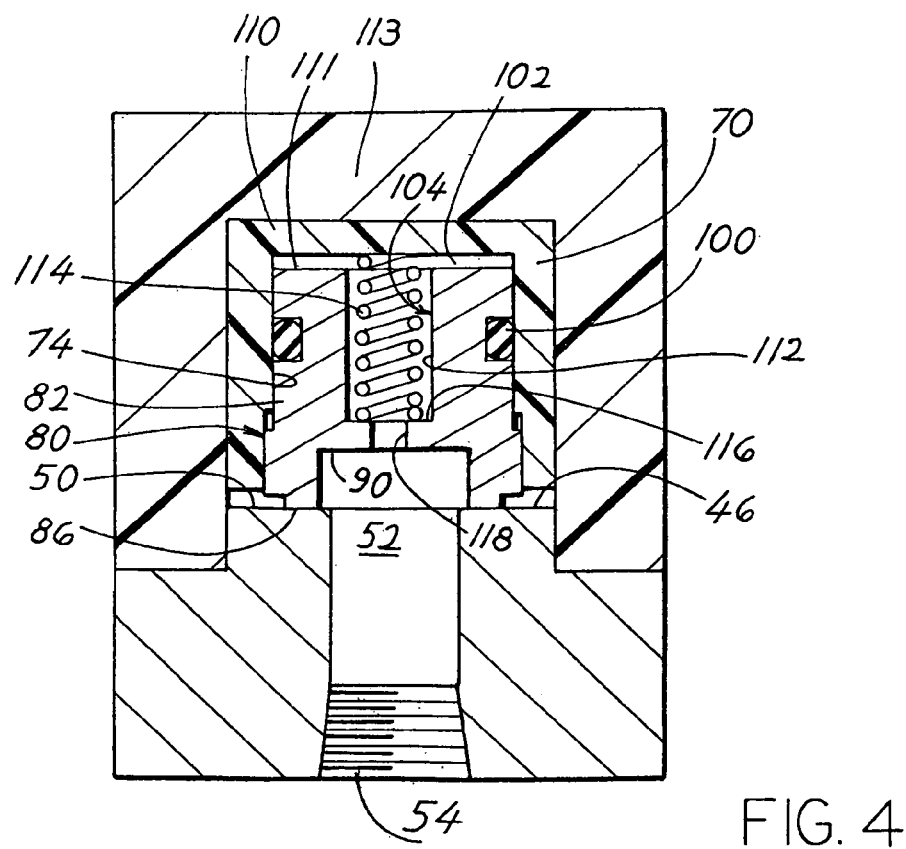
FIG. 4 is a sectional view taken on line 4—4 of FIG. 1.

FIG. 4 shows that the seal surface 86 of the valving member 80 presses tightly against the sealed-against surface 50 of the lower housing wall 46. The vertical guiding part 82 of the valving member lies closely within the vertical bore 74 of the shuttle frame, which assures that the valving member moves horizontally with the shuttle frame 70. A seal 100 of the O-ring type seals the guide part 82 against the walls of the vertical bore 74, to form a sealed region 102 above the O-ring. A conduit 104 connects the recess 90 to the sealed region 102. The recess 90 is always in communication with the first hole 52 which is in constant communication with the high pressure source through port 54. Accordingly, high pressure air can pass through the conduit 104 to the sealed region 102 so the sealed region contains pressured air over the entire area of the top 111 of the valving member 80. The area at 111 is much greater than the area of the recess 90, so the pressured air in the sealed region 102 presses down the valving member 80 with a high force that is largely proportional to the pressure of air applied to the high pressure port 54. The pressured air in the sealed region 102 also presses the top wall 110 of the shuttle frame 70 up against an upper wall 113 of the shuttle frame.

The conduit 104 includes an upper vertical conduit part 112 that holds a compression spring 114. This spring has a lower end that presses downward against a wall 116 at the bottom of the upper conduit part, and has an upper end that presses upward against an upper wall of the shuttle frame. This assures that the seal surface 86 of the valving member is always pressed down firmly against the housing sealed-against surface 50, even when the air pressure is zero, to assure that when air pressure is applied the surfaces 50, 86 will be in firm contact with each other. The conduit has a lower conduit part 118 that connects to the recess 90.

Figure 5:
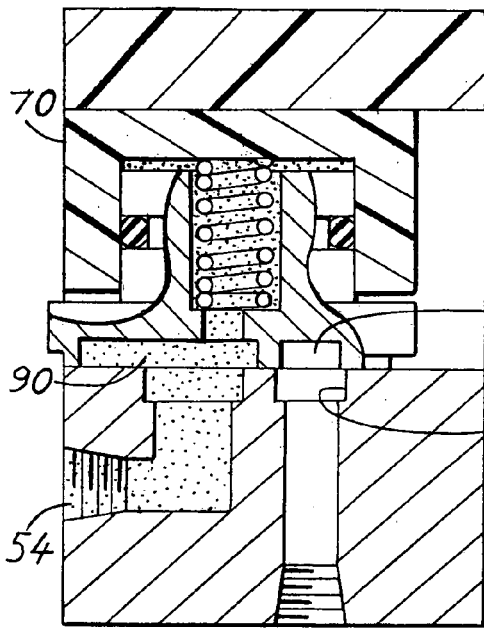
FIG. 5 is a sectional view taken on line 5—5 of FIG. 1, with the shuttle in its initial leftward position.
Figure 6:
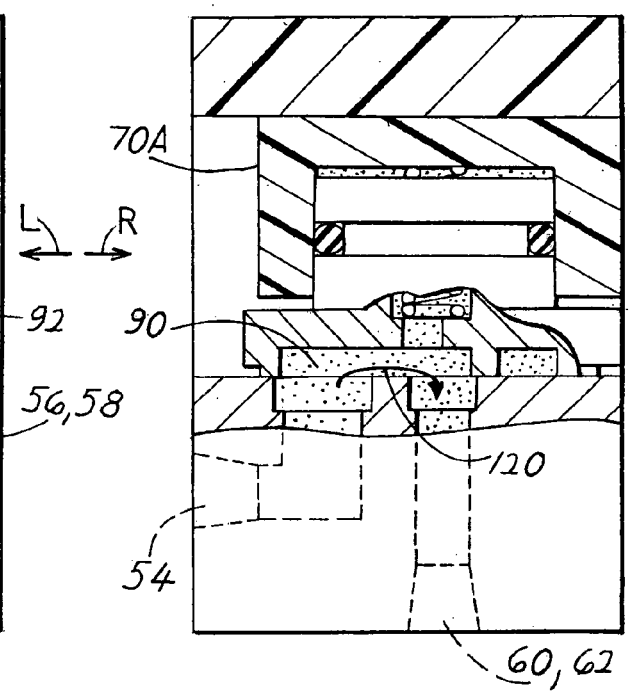
FIG. 6 is a view similar to that of FIG. 5, but with the shuttle having moved rightward to a first rightward position.

FIG. 5 shows the shuttle 70 in a leftward position, wherein the left recess 90 is in communication only with the high pressure air port 54. The second holes 56, 58 are connected together by right recess 92, to equalize the pressure of the two air bags. FIG. 6 shows the shuttle at 70A after it has moved rightward to a rightward position, wherein the recess 90 connects the high pressure port 54 to the air bag ports 60, 62. Air flows along the path indicated by arrow 120 through the recess 90, from the high pressure source to the air bags to fill them. As soon as the air bags approach the desired height, the solenoid or other actuator rapidly moves the shuttle back to its leftward position shown in FIG. 5, to stop the filling of the air bags.

It is known to use air pressure passing through a valve, to press a sealed surface against a sealed-against surface. Since the air pressure of the high pressure source is usually over 100 psi in this application, and the area of the seal surface 86 of FIG. 3 is relatively small, the air pressure can apply a large pressure such as 400 pounds per square inch of seal surface. This prevents the high pressure air from leaking out of the valve. However, when the air pressure is zero, which may occur when the vehicle is not in use, the only force pushing down the valving member is the force of the spring, which may be only several pounds.

In a valve that applicant has designed, of the construction shown in FIGS. 1–6, the seal surface shown in FIG. 3 had a lateral width W of 0.538 inch (13.66 mm) and a longitudinal length E of 0.776 inch (19.72 mm), for a total area of 0.42 square inch within the periphery. The recess 90 had a width of 0.352 inch and a length of 0.338 inch, for an area of 0.12 inch and the recess 92 had about 75% of the area of recess 90. The area of 0.42 square inch within the periphery of the sealed surface 86, was small, so the cost of precision polishing was moderate. If a disc were used, which was large enough to provide a recess of the same size of the recess 90, then the area within the periphery of the seal surface of such a disc would be about 50% to 100% greater than the area of the seal surface 86, as measured within its outer boundaries. The reduced area to be precision ground, reduces the cost of the valve.

The width A between the outer edge of the seal surface and each recess was 0.085. This width was calculated to be necessary to prevent substantial leakage of air to the outside. The width of the seal surface part 130 between the two recesses 90, 92 was 0.060, which was calculated to be sufficient because of the reduced pressure difference across this area (e.g. from 140 psi to 60 psi).

The sealed-against surface 50 (FIG. 2) of the lower passage wall 46, had a width B of 0.893 inch, and a length C of 1.125 inch. This is still less than the area of a surface that must press against a disc having a same size first hole 52.

Figure 7:
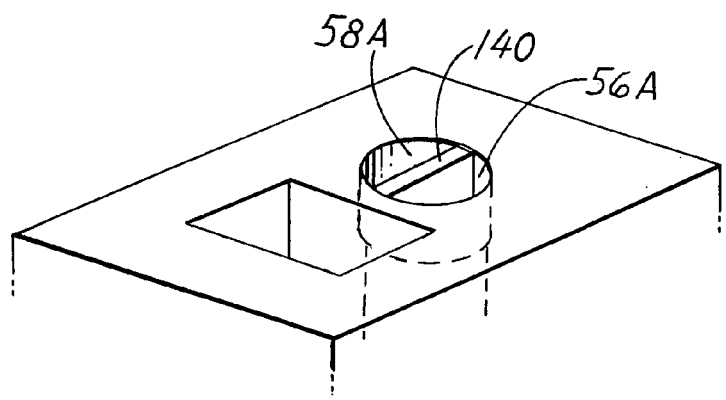
FIG. 7 is a partial isometric view showing the housing passage lower surface of a valve of another embodiment of the invention.

Although the valve of FIGS. 1–6 shows the recess 92 (FIG. 3) used to connect the two air bag holes 56, 58 (FIG. 2), applicant can eliminate the recess 92 and leave that area of the seal surface 86 flat and even with the rest of the seal surface 86. Instead, applicant can construct the housing bottom passage wall as shown in FIG. 7, with a restricted connection 140 between first and second air bag holes 56A, 58A. The cross-sectional volume above the wall forming the restricted connection 140, allows air to slowly pass from one air bag to another. If a vehicle is turning and leaning, so one air bag pressure is temporarily higher than the other, the small area connection 140 will allow air to only slowly flow, so the air pressure of the two air bags will not change much and can quickly equalize when the vehicle stops turning and therefore leaning.

Figure 8:
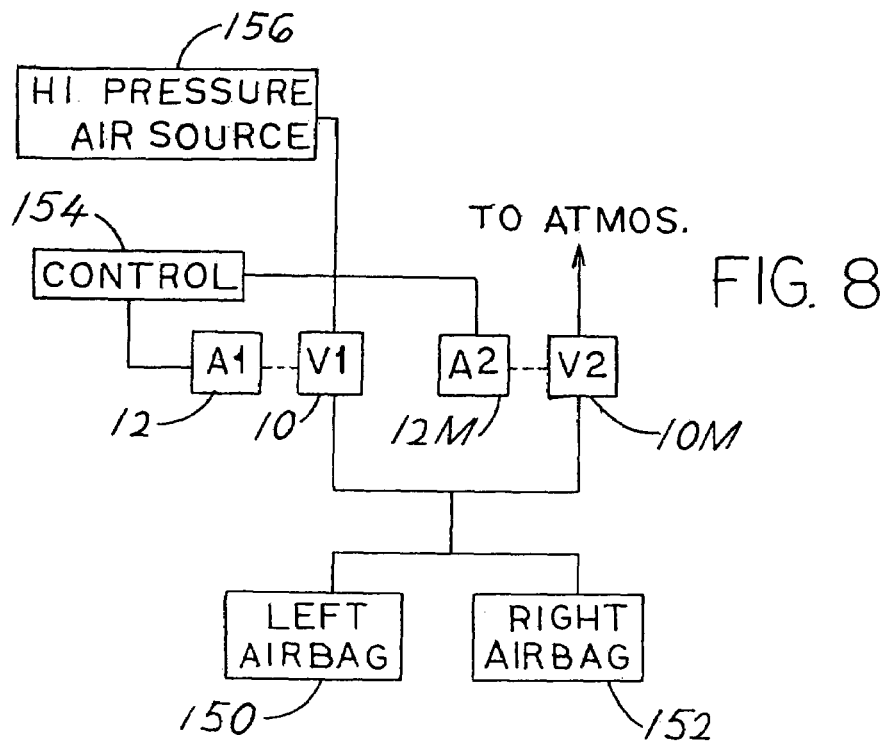
FIG. 8 is a schematic diagram of a vehicle air bag system in which valves of the present invention can be used.

Sometimes, the air bag height will be greater than optimal. In that case, it is necessary to dump some of the air from an air bag into the atmosphere. FIG. 8 shows an air bag system that accomplishes both filling of air bags when the air bag height is too low, and dumping of air from the air bags into the atmosphere when the air bag height is too high. Two valves 10, 10M are used, which are both connected to the left and right air bags, 150, 152. When a control 154 senses that the average air bag height is too low, it operates an actuator 12 that moves the shuttle of the valve 10 from left to right, to refill the air bags from a high pressure source 156, until a desirable height is reached. When the control 154 senses that the average air bag height is greater than desirable, it energizes another actuator 12M to operate another valve 10M which is similar to the valve of FIGS. 1–6. The valve 10M then opens the air bags to the atmosphere, to allow the escape of pressured air in the bag, until the air bag height has dropped to a desired range. In one example, it is desirable that the average air bag height is 15 inches. If it drops below 14.5 inches, the air bag is refilled to 15 inches, while if the height exceeds 15.5 inches, then some air in the air bag is released into the atmosphere. Commonly, two air bags on opposite sides of the same location (e.g. at the rear, middle or front of the vehicle) are connected together, although valves can be used for a single air bag.

Figure 9:
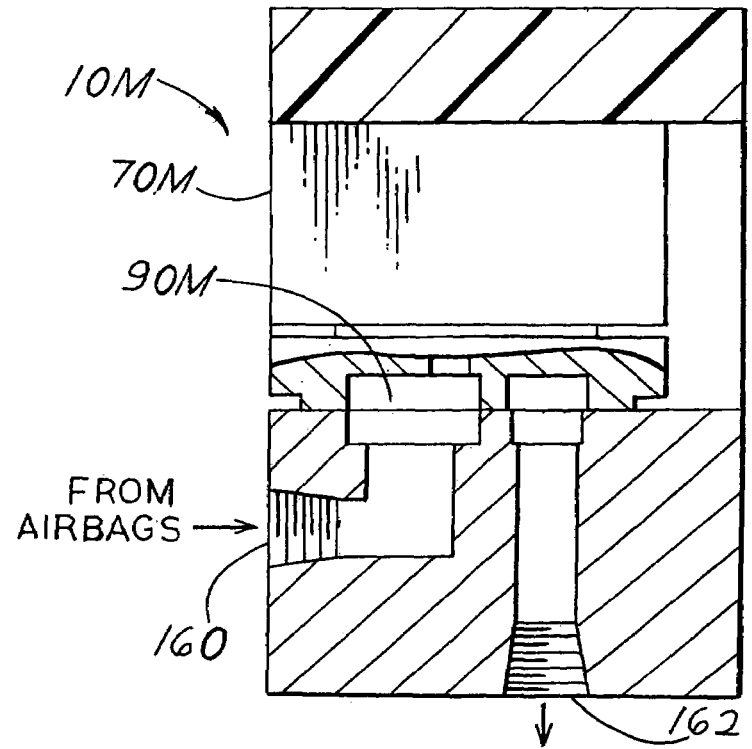
FIG. 9 is a sectional view of a valve similar to that of FIGS. 1–6, but being used to connect air bags to the atmosphere to dump pressured air thereto.

FIG. 9 shows valve 10M used for connecting air bags to the atmosphere. One or two air bag ports 160 are connected through a main recess 90M of the valve to a port 162 that opens to the atmosphere. Such connection occurs when the shuttle 70M moves to the right.

While terms such as "upper," "lower," etc. have been used in the description and claims to describe the invention as it is illustrated, it should be understood that the valve and its parts can be used in any orientation with respect to the Earth.

Thus, the invention provides a vehicle leveling valve for controlling the passage of air between one or more air bags and a high pressure source, or the atmosphere, wherein the precisely polished sealing surfaces are of minimal size, for valve recesses of a predetermined size. This is accomplished by mounting a valving member that forms a seal surface, in a shuttle that moves linearly, or in left and right directions. The housing has a corresponding precisely polished sealed-against surface which is somewhat larger to remain sealed against the seal surface while the seal surface shuttles from left to right. The shuttle includes a valving-member with a guide part that lies closely within a vertical bore of a shuttle frame. The guide part is sealed to the vertical bore to form a sealed region at the top of the sealed passage. A recess in the seal surface is connected through a conduit to the sealed region at the top of the vertical bore, so the guide part is pressed down largely proportionally to the air pressure to which the recess is exposed. The conduit has a primarily vertical part that holds a spring, with the lower end of the spring pressing down against the valving member and the upper end pressing upward against the shuttle frame.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A vehicle leveling valve for selectively passing air from a high pressure source to an air bag, which includes a housing having a shuttle-confining passage with top and bottom housing passage walls, a shuttle lying in said housing passage, said shuttle including a shuttle frame slidable in left and right directions in said housing passage, and said shuttle including a valving member that slides in said left and right directions with said shuttle frame, said bottom housing wall forming a housing sealed-against surface with a first hole for connection to said high pressure air source and a second hole for connection to said air bag, said valving member having a seal surface that lies facewise against said housing sealed-against surface, said seal surface having a recess that opens only to said housing first hole in a left position of the shuttle, and that opens to both said first and second holes when said shuttle moves rightward to a second position, and said shuttle frame has a vertical bore and said valving member has an upstanding guiding part that is vertically slideably received in said shuttle frame vertical bore to allow said valving member to slide vertically in said shuttle frame; wherein:

said vertical bore in said shuttle frame has a closed upper end, and including a seal that seals said guiding part to an upper portion of said valving member to prevent the outflow of pressured air from said bore upper portion, said valving member having a conduit that connects said recess to a location along said guiding part that lies above said seal, to apply pressured air to said vertical bore upper portion, to thereby press down said seal surface against said housing sealed-against surface by a force that is largely proportional to the air pressure from said high pressure source;

said bottom housing wall forms a second hole for connection to a second air bag, said first and second holes having upper ends at said housing sealed-against surface that are both connected to said recess in said second position of said shuttle;

said bottom housing sealed-against surface and said valving member seal surfaces are constructed so one of them forms a restricted passage that connects said upper ends of said first and second holes to flow air between said holes without said air flowing through said recess, said restricted passage allowing less than half the flow rate of air therethrough than occurs from said recess to said air bag holes when said shuttle is in said rightward position, for a given pressure difference.

2. A vehicle leveling valve for selectively passing air from a high pressure source to an air bag, which includes a housing having a shuttle-confining passage with top and bottom housing passage walls, a shuttle lying in said housing passage, said shuttle including a shuttle frame slidable in left and right directions in said housing passage, and said shuttle including a valving member that slides in said left and right directions with said shuttle frame, said bottom housing wall forming a housing sealed-against surface with a first hole for connection to said high pressure air source and a second hole for connection to said air bag, said valving member having a seal surface that lies facewise against said housing sealed-against surface, said seal surface having a recess that opens only to said housing first hole in a left position of the shuttle, and that opens to both said first and second holes when said shuttle moves rightward to a second position, and said shuttle frame has a vertical bore and said valving member has an upstanding guiding part that is vertically slideably received in said shuttle frame vertical bore to allow said valving member to slide vertically in said shuttle frame; wherein:

said vertical bore in said shuttle frame has a closed upper end, and including a seal that seals said guiding part to an upper portion of said valving member to prevent the outflow of pressured air from said bore upper portion, said valving member having a conduit that connects said recess to a location along said guiding part that lies above said seal, to apply pressured air to said vertical bore upper portion, to thereby press down said seal surface against said housing sealed-against surface by a force that is largely proportional to the air pressure from said high pressure source;

said shuttle frame has a coupling protruding leftward from a left side of the shuttle frame; and including a solenoid having a solenoid plunger connected to said coupling.

3. A vehicle leveling valve assembly for selectively passing air from a high pressure source to an air bag, and for selectively passing air from said air bag to the atmosphere, comprising:

first and second valves that are each of the same construction, each valve including a housing having a shuttle-confining passage with top and bottom housing passage walls, a shuttle lying in said housing passage, said shuttle including a shuttle frame slidable in left and right directions in said housing passage, and said shuttle including a valving member that slides in said left and right directions with said shuttle frame, said bottom housing wall forming a housing sealed-against surface with a first and second holes, said valving member having a seal surface that lies facewise against said housing sealed-against surface, said seal surface having a recess that opens only to said housing first hole in a left position of the shuttle, and that opens to both said first and second holes when said shuttle moves rightward to a second position, and said shuttle frame has a vertical bore and said valving member has an upstanding guiding part that is vertically slideably received in said shuttle frame vertical bore to allow said valving member to slide vertically in said shuttle frame, said vertical bore in said shuttle frame has a closed upper end, and including a seal that seals said guiding part to an upper portion of said valving member to prevent the outflow of pressured air from said bore upper portion, said valving member having a conduit that connects said recess to a location along said guiding part that lies above said seal, to apply pressured air to said vertical bore upper portion, to thereby press down said seal surface against said housing sealed-against surface by a force that is largely proportional to the air pressure from said high pressure source;

the first hole of said first valve connected to said high pressure source and said second hole of said first valve connected to a first air bag;

the first hole of said second valve connected to said first air bag and the second hole of said second valve connected to the atmosphere.

4. A vehicle leveling valve for selectively passing air from a high pressure source to an air bag, which includes a housing having a shuttle-confining passage with top and bottom housing passage walls, a shuttle lying in said housing passage, said shuttle including a shuttle frame slidable in left and right directions in said housing passage, and said shuttle including a valving member that slides in said left and right directions with said shuttle frame, said bottom housing wall forming a housing sealed-against surface with a first hole for connection to said high pressure air source and a second hole for connection to said air bag, said valving member having a seal surface that lies facewise against said housing sealed-against surface, said seal surface having a recess that opens only to said housing first hole in a left position of the shuttle, and that opens to both said first and second holes when said shuttle moves rightward to a second position, and said shuttle frame has a vertical bore and said valving member has an upstanding guiding part (82) that is vertically slide-ably received in said shuttle frame vertical bore to allow said valving member to slide vertically in said shuttle frame, wherein:

said vertical bore in said shuttle frame has a closed upper end, and said shuttle includes a seal that seals said guiding part to an upper portion of said valving member to prevent the outflow of pressured air from said bore upper portion, said valving member having a conduit that connects said recess to a location along said guiding part that lies above said seal, to apply pressured air to said vertical bore upper portion, to thereby press down said seal surface against said housing sealed-against surface by a force that is largely proportional to the air pressure from said high pressure source;

said shuttle frame has a closed top wall (110) that is pressed upward against said top housing passage wall (113), so said closed top wall slides along said top housing passage wall without having to form a fluid-tight seal against it.

5. The valve described in claim 4 including a spring that urges the shuttle frame against the top housing passage wall, wherein:

the portion of the inside of said shuttle-confining passage which lies around said shuttle, is open to the atmosphere.

\* \* \* \* \*